(12) United States Patent
Niemann et al.

(10) Patent No.: US 9,016,148 B2
(45) Date of Patent: Apr. 28, 2015

(54) HOLDING DEVICE FOR A PANE SENSOR

(75) Inventors: Thomas Niemann, Delmenhorst (DE); Jürgen Palloks, Westerstede (DE); Uwe Röben, Zetel (DE)

(73) Assignee: Hella KGaA Hueck & Co., Lippstadt (DE)

(*) Notice: Subject to any disclaimer, the term of this patent is extended or adjusted under 35 U.S.C. 154(b) by 327 days.

(21) Appl. No.: 13/548,978

(22) Filed: Jul. 13, 2012

(65) Prior Publication Data

US 2013/0014601 A1  Jan. 17, 2013

(30) Foreign Application Priority Data

Jul. 14, 2011  (DE) .................. 10 2011 107 353

(51) Int. Cl.
*G01D 11/30* (2006.01)
*B60R 11/00* (2006.01)

(52) U.S. Cl.
CPC ............... *B60R 11/00* (2013.01); *G01D 11/30* (2013.01); *B60R 2011/0026* (2013.01); *B60R 2011/0071* (2013.01)

(58) Field of Classification Search
CPC ............ B60R 2011/0026; B60R 2011/0071; B60R 11/00; B60S 1/0881; G01D 11/245; G01D 11/30; G01D 11/24
USPC ............... 73/866.5; 248/208, 346.01, 346.03, 248/346.04, 503, 613, 689, 690
See application file for complete search history.

(56) References Cited

U.S. PATENT DOCUMENTS

2004/0211875 A1* 10/2004 Wisniewski et al. .......... 248/500
2009/0224120 A1*  9/2009 Wohlfahrt et al. ....... 248/226.12

FOREIGN PATENT DOCUMENTS

| DE | 29924838 U1 | | 1/2006 |
|---|---|---|---|
| DE | 202006000853 U1 | | 5/2007 |
| DE | 102005057589 | * | 6/2007 |
| DE | 102006033642 A1 | | 1/2008 |
| DE | 202006017362 U1 | | 3/2008 |
| DE | 102006054026 | * | 5/2008 |
| DE | 102006061308 A1 | | 6/2008 |
| DE | 102008028978 A1 | | 12/2009 |
| DE | 102008028979 | * | 12/2009 |
| DE | 102008044839 A1 | | 3/2010 |
| DE | 102009011613 A1 | | 9/2010 |
| DE | 102009011614 | * | 9/2010 |

* cited by examiner

*Primary Examiner* — Daniel S Larkin
(74) *Attorney, Agent, or Firm* — Muncy, Geissler, Olds & Lowe, P.C.

(57) ABSTRACT

In a holding device for a sensor, in particular for a rain/light sensor, for mounting on the inner side of a window pane, such as a vehicle pane or suchlike, with at least one holder able to be fastened on the window pane, which holder has a mount for the sensor, and with at least one spring component for fixing the sensor in the mount of the holder, the spring component has detent means for at least a partially detachable connection to the holder. The spring component comprises a spring section with a snap function, which is constructed such that the spring section is in one of two stable spring positions, wherein in one spring position a spring force acts on the sensor.

12 Claims, 1 Drawing Sheet

HOLDING DEVICE FOR A PANE SENSOR

TECHNICAL FIELD

The invention relates to a holding device for a sensor, in particular a rain/light sensor for mounting on the inner side of a window pane, such as a vehicle pane or suchlike, with at least one holder, able to be fastened on the window pane, which holder has a mount for the sensor, and with at least one spring component for fixing the sensor in the mount of the holder.

BACKGROUND

For the mounting of, for example, rain/light sensors, holding devices of the previously designated type are used, in order to be able to ensure a uniform contact pressure of the installation side of the sensor, embodied in particular elastically, on the inner side of a window pane. The uniform contact pressure of the sensor with its elastic installation side or respectively its pad region is necessary, so that the curvature of the pane can be equalized and the optics of the sensor can always connect optimally to the inner side of the window pane. The full functional capability of the sensor is to be ensured with the full connection.

The known holding devices have, for this, in particular a holder, able to be fastened to the window pane, which has at least one mount for the sensor. In order to be able to fix the sensor in the mount of the holder, at least one spring component is used. The spring component acts with a predetermined spring force or spring tension on the sensor which is inserted in the mount of the holder. For this, the spring component is engaged with the holder which is usually glued on the inner side of the window pane. In so doing, at the same time as the engaging of the spring component on the holder, the spring tension fixing the sensor in the mount is also to be produced, which must generally take place manually with a relatively high contact pressure of up to 40 N. The mounting of the sensors with the aid of previously designated holding devices is consequently relatively complicated. Furthermore, the mounting is subsequently to be subjected to a visual check, in order to monitor the correct engagement of the spring components with the holder of the holding device.

SUMMARY

The invention is based on the problem of improving a holding device of the previously designated type to the effect that the mounting of a sensor on the inner side of a window pane is simplified in an advantageous manner.

The solution to the problem takes place according to the invention by a holding device as discussed below. Advantageous further developments and embodiments of the invention are discussed below.

In a holding device for a sensor, in particular a rain/light sensor, for mounting on the inner side of a window pane, such as a vehicle pane or suchlike, with at least one holder, able to be fastened on the window pane, which has a mount for the sensor, and with at least one spring component for fixing the sensor in the mount of the holder, provision is made according to the invention that the spring component has detent means for at least a partially detachable connection on the holder, and the spring component comprises a spring section with a snap function, which is constructed such that the spring section is in one of two stable spring positions, wherein a spring force acts on the sensor in one spring position.

By means of a holding device constructed in such a way according to the invention, an advantageously simplified mounting of the sensor in the mount of the holder and hence on, for example, a windscreen of a vehicle, is ensured. The engaging of the spring component on the holder takes place here in the spring position in which the spring component has a curvature or arching pointing away from the sensor and thereby does not yet generate any spring force or contact pressure onto the sensor. Consequently, the engaging of the spring component is possible manually with an advantageously reduced effort. Only after the complete engaging of the spring component is the spring section brought by the application of force from the one spring position into the other spring position, wherein the spring component on transition of the neutral position snaps over directly into the other spring position. The spring section now exerts a contact pressure onto the sensor, which is pressed with its elastic installation side or respectively its pad region against the inner side of the window pane. The contact pressure which is thereby generated is sufficiently great in order to ensure an optimum connection of the sensor optics to the window pane. The spring component which is used, which operates similarly to a "clicker frog" principle, can be connected securely with the holder for example via an articulation point, and can be connected detachably with the holder by means of its detent means at a second connection point, so that the spring component can be moved out from the region of the mount.

According to an advantageous further development of the invention, provision is made that the spring section which is able to be snapped over runs in a plane arranged approximately parallel to the free cross-section of the mount, wherein the deflection direction of the spring section is aligned perpendicularly to the spanned plane. With such a configuration of the spring section according to the invention, an advantageous fixing of the sensor in the mount of the holder is ensured. Via the spring section, which is able to be snapped over, which is arranged above the opening of the mount, the spring force always acts advantageously in the direction of the mount opening and presses the sensor, after the snapping-over process, directly into the mount and hence against the inner side of the window pane, for example of a motor vehicle. As the snapping-over process is reversible, i.e. can also be carried out in the opposite direction, the spring section can be moved back, if necessary, into the spring position releasing the sensor. Therefore, after the unlocking of the spring component on the in particular frame-like holder, the sensor can be advantageously simply exchanged if necessary.

The spring section, which is able to be snapped over, extends here at least through the central axis of the mount of the holder, whereby an advantageously uniform transmission of force onto the sensor is achieved. The spring section extending over the sensor can be constructed here in a strip shape and preferably acts from a lateral edge over the central region up to the other lateral edge to at least the rear side of the optical sensor. It is also conceivable, instead of one spring component to use two spring components with respectively one spring section, or respectively to use one spring component with two spring sections running at particular angles with respect to one another. The spring sections, which are in particular also constructed in a strip shape, can be arranged respectively at right-angles to one another.

Preferably, the spring section is a snap disc, which constitutes a structurally advantageous possibility for the construction of a spring section acting on the sensor. By means of a snap disc, an advantageously great contact pressure can be produced onto the rear side of the sensor, so that the latter is pressed with its installation side optimally onto the inner side of the window pane. In this connection, the snap disc has a spring section having a relatively large area, which itself is always able to be brought in a simple manner from a spring position releasing the sensor into a spring position pressing the sensor onto the window pane. The snap disc, which has approximately the size and shape of the cross-section of the mount, has for this purpose in its central region a central region bulging out from the plane. To reinforce the outer edge region of the snap disc, which is in particular circular, this edge region is provided with a circumferential bead, which gives the snap disc an advantageous rigidity or strength in the edge region.

On the spring section, at least two detent means are arranged along a pitch circle, the central point of which is arranged approximately in the central region of the spring section. By the use of two or more detent means, an advantageously secure arresting of the spring component on the frame-like holder of the holding device is ensured. The detent means are constructed in particular in one piece with the spring section, whereby an advantageously secure connection is achieved between the spring section and the detent means of the spring component. Each of the detent means arranged on the spring section has in particular respectively an identical angular distance from a directly adjacent detent means. The detent means are therefore arranged distributed uniformly on the periphery of the spring section which is constructed in particular as a snap disc.

According to a further development, provision is made that each detent means is a hook element which corresponds in a form-fitting manner with an undercut formed on the holder. With the configuration of a form-fitting connection between spring component and holder, a form-fitting connection is created which is able to be produced advantageously simply, which if necessary can also be released again relatively simply. The detent means engage here in particular into regions of the holder of the holding device which are associated with the mount for the sensor. The undercuts are preferably constructed in particular frame sections of the holder forming the sensor mount, so that the detent means engage at a relatively small distance from the sensor, and thereby correspondingly small leverage forces thereon are produced.

Preferably, the detent means are arranged directly on the periphery of the snap disc, wherein respectively a first part section runs approximately parallel to the central axis of the snap disc, to which a radially outwardly projecting extension adjoins. With a hook element constructed in such a manner, a structurally simple and relatively rigid configuration of each detent means is ensured, which thereby enables a secure hold of the spring component on the holder. The hook elements arranged on the periphery of the snap disc have in particular a rectangular cross-section, wherein the first part section preferably runs parallel to an edge side of the sensor which is held in the mount.

According to another further development of the invention, provision is made that the mount of the holder for the sensor is constructed as a central mount with frame sections extending around it. By means of the central mount, around which the frame sections of the holder run, an advantageously simple securing in position and fixing of the sensor on the inner side of a window pane, for example of a motor vehicle, is possible. In addition, an optimum force transmission is ensured on the holder which is fastened circumferentially around the sensor on the inner side of the window pane, so that with the spring component, which engages directly on the holder, a relatively great and in particular uniformly distributed contact pressure can be exerted onto the sensor which is to be connected to the inner side of the window pane. The holder has here in particular a circular frame section, on which a U-shaped projection, consisting of straight part sections, is arranged.

In the case of a window pane for a motor vehicle, in particular a windscreen, for which independent protection is applied for, which is equipped with a sensor, provision is made to fix the sensor on the inner side of the window pane with a holding device as discussed below.

On a windscreen of a vehicle, an optical sensor, connected via a holding device according to the invention in such a manner, can always be mounted in an advantageously simple manner on the inner side thereof. The curvature of the pane which is present can be equalized optimally here, wherein a uniform connection of the sensor is achieved. Furthermore, the sensor can be exchanged in a relatively simple manner if necessary. In addition, a spring component according to the invention which is used here can have advantageously reduced dimensions. The spring component therefore no longer projects on the outer side of the holder, which is securely connected with the pane, so that the predetermined installation space is advantageously sufficient. Thereby, an improved protection of the occupants is ensured, for example in the case of a head impact.

BRIEF DESCRIPTION OF THE DRAWINGS

A possible example embodiment of the invention, from which further inventive features will emerge, is illustrated in the drawings. There are shown:

DETAILED DESCRIPTION 1 designates a holding device for a sensor 3 to be mounted on the inner side of a window pane 2 of a vehicle, which holding device has a holder 4 and a spring component 5. The holder 4 has a mount 6 in which the sensor 3 is inserted, wherein it sits with its elastic installation side 7 on the inner side of the window pane 2. Subsequently, as illustrated by FIG. 1, the spring component 5 is connected with the holder 4, wherein detent means 8, 8' engage behind undercuts 9, 9' constructed on the holder, and thereby a form-fitting connection is produced. The spring component 5 has, furthermore, a spring section 10 which is stamped or respectively compressed such that the spring component has a snap function. In FIG. 1, the spring section 10 is in a spring position 11 with a curvature facing away from the sensor 3, so that the spring section does not exert any spring force onto the optical sensor 3. By applying a force acting in the direction of the arrow 12, the spring section 10 of the spring component 5 snaps, as is now illustrated in FIG. 2, around or over into its lower spring position 13. The central region thereof and also the edge regions of the spring section 9 now produce a contact pressure onto the rear side of the sensor 3. The sensor 3 is thereby fixed securely inside the mount 6 and, moreover, an optimum and uniform connection takes place of the elastic installation side 7 on the window pane 2.

Figure 1:
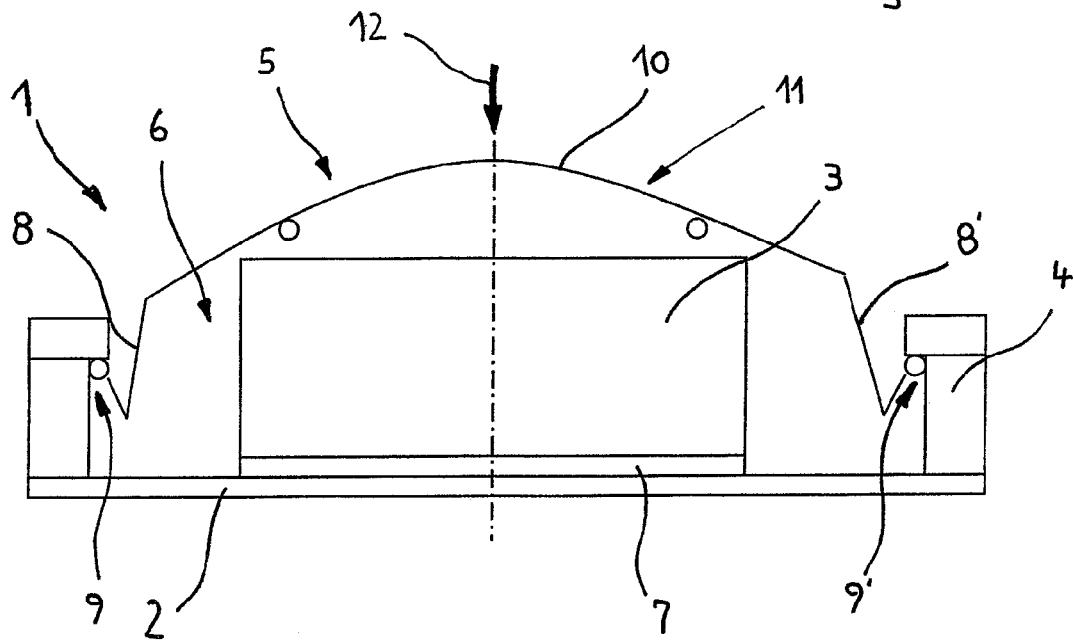
FIG. 1: a view of the holding device according to the invention with the spring component in the upper spring position.
Figure 2:
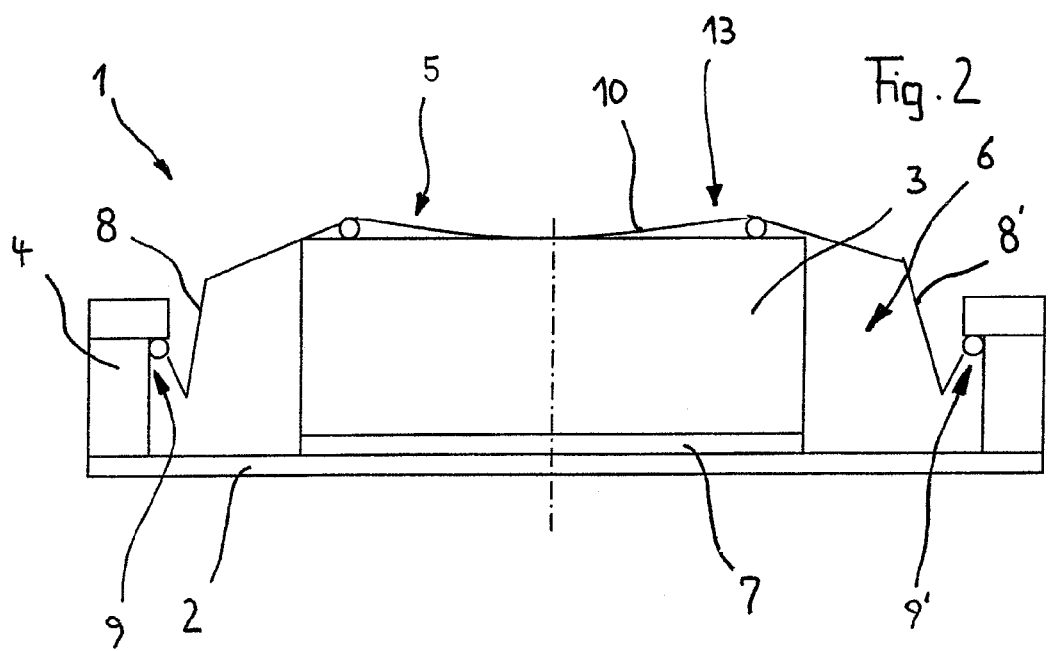
FIG. 2: a view of the holding device according to the invention with its spring component pressing against the sensor.

The invention claimed is:

1. A holding device for a sensor, for mounting on the inner side of a window pane or a vehicle pane, with at least one holder able to be fastened to the window pane, which the at least one holder has a mount space for the sensor, and with at least one spring component for fixing the sensor in the mount space of the at least one holder,
wherein
the at least one spring component has at least two detent means for at least one partially detachable connection on the at least one holder, and
the at least one spring component comprises a spring section with a snap function, which is constructed such that the spring section is in one of two stable spring positions, wherein the spring section does not exert any spring force on the sensor in a first spring position and a spring force acts on the sensor in a second spring position while the at least one spring component is connected to the at least one holder in both positions via the at least two detent means.

2. The holding device according to claim 1, wherein the spring section, which is able to be snapped over, runs in a plane arranged approximately parallel to a free cross-section of the mount space, wherein the deflection direction of the spring section is aligned perpendicularly to the spanned plane.

3. The holding device according to claim 1, wherein the spring section, which is able to be snapped over, extends at least through the central axis of the mount space.

4. The holding device according to claim 1, wherein the spring section is constructed as a snap disc.

5. The holding device according to claim 4, wherein the at least two detent means are arranged on the periphery of the snap disc, wherein respectively a first part section runs approximately parallel to the central axis of the snap disc, to which a radially outwardly projecting extension adjoins.

6. The holding device according to claim 1, wherein on the spring component the at least two detent means are arranged along a pitch circle, the central point of which is arranged approximately congruent with the central region of the spring section.

7. The holding device according to claim 1, wherein each detent means is a hook element which corresponds in a form-fitting manner with an undercut formed on the at least one holder.

8. The holding device according to claim 1, wherein the mount space for the sensor is constructed as a central mount area with frame sections extending around it.

9. The holding device according to claim 1, wherein the position of the at least two detent means is unchanged when the spring section is at the first spring position or the second spring position.

10. The holding device according to claim 1, wherein the sensor is a rain/light sensor.

11. A window pane for a motor vehicle, which is equipped with the sensor which is held on the inner side of the window pane by the holding device according to claim 1.

12. The window pane for a motor vehicle according to claim 11, wherein the window pane is a windowscreen.

* * * * *